United States Patent [19]
Kinoshita et al.

[11] Patent Number: 5,757,150
[45] Date of Patent: May 26, 1998

[54] ELECTRIC SYSTEM OF AN ELECTRIC VEHICLE

[75] Inventors: Shigenori Kinoshita; Shunichi Hatakeyama, both of Kawasaki, Japan

[73] Assignee: Fuji Electric Co., Ltd., Kanagawa, Japan

[21] Appl. No.: 708,875

[22] Filed: Sep. 5, 1996

Related U.S. Application Data

[63] Continuation of Ser. No. 288,506, Aug. 10, 1994, abandoned.

[30] Foreign Application Priority Data

Aug. 12, 1993 [JP] Japan ................... 5-220666

[51] Int. Cl.$^6$ .................................................. H01H 9/20
[52] U.S. Cl. ................... 318/139; 307/10.7; 337/30; 337/401; 200/61.08
[58] Field of Search .................. 102/275.5; 337/30, 337/401; 439/258; 200/61.08; 180/271, 279, 274, 232; 280/734, 735, 777, 779, 730 A, 730 R; 307/10.1, 4.1, 10.7; 318/139, 254, 439, 138

[56] References Cited

U.S. PATENT DOCUMENTS

| | | | |
|---|---|---|---|
| 3,680,886 | 8/1972 | Mazelsky. | |
| 3,793,501 | 2/1974 | Stonestrom | 200/61.08 |
| 3,818,431 | 6/1974 | Hosaka | 307/10 R |
| 3,851,219 | 11/1974 | Kozorezov et al. | 337/401 |
| 4,072,835 | 2/1978 | Burke | 200/61.47 |
| 4,339,638 | 7/1982 | Lascelles et al. | 200/61.08 |
| 4,581,504 | 4/1986 | Hamel, Sr. | 200/61.08 |
| 4,621,561 | 11/1986 | Weldon | 200/150 R |
| 4,695,075 | 9/1987 | Kamiji et al. | 280/735 |
| 4,920,446 | 4/1990 | Pflanz | 337/30 |
| 5,318,145 | 6/1994 | Vollmer | 180/274 |
| 5,320,384 | 6/1994 | Arnold et al. | 280/777 |
| 5,389,824 | 2/1995 | Moroto et al. | 307/10.1 |
| 5,574,316 | 11/1996 | Nieschulz | 307/10.7 |

FOREIGN PATENT DOCUMENTS

| | | |
|---|---|---|
| 530717 | 3/1993 | European Pat. Off. |
| 5236602 | 10/1993 | Japan |

*Primary Examiner*—John W. Cabeca
*Attorney, Agent, or Firm*—Spencer & Frank

[57] ABSTRACT

An electric system of an electric vehicle including a main battery as a power supply, and a semiconductor power converter for driving a wheel driving motor. Impact destroying switches are inserted into connecting lines which connect a main battery to the semiconductor power converter, and into a connecting line connecting main battery block. Each impact destroying switch breaks its conduction by blasting an explosive in the switch in response to the impact due to a collision of the vehicle body. In case of an emergency such as a collision, since the main battery is instantaneously disconnected from the connecting lines by the switches, the connecting lines become free from the voltage. This makes it possible to prevent fire, and to cut off the vehicle body to save passengers.

19 Claims, 5 Drawing Sheets

ELECTRIC SYSTEM OF AN ELECTRIC VEHICLE

This application is a continuation of application Ser. No. 08/288.506, filed Aug. 10, 1994 now abandoned.

BACKGROUND OF THE INVENTION

1. Field of the Invention

The present invention relates to an electric system of an electric vehicle, which includes a battery as a power supply and an inverter driving an AC motor for driving wheels.

2. Description of Related Art

FIG. 1 shows a conventional driving system of an electric vehicle. It has a battery as a power supply, and an inverter driving an AC motor which in turn drives wheels. In this figure, the reference numeral 1 designates a main battery consisting of a number of serially connected unit cells 100. The reference numeral 4 designates an inverter that drives an AC motor 5 for driving wheels. The reference numeral 3 designates a protective fuse employed as needed. The reference numeral 2 designates a main switch for electrically connecting or disconnecting the inverter 4 with the main battery 1. The output axis of the motor 5 is coupled to a differential gear 7 via a reduction gear 6, and drives wheels 81 and 82.

In an existing electric vehicle, the ratio of the weight and space of the main battery is greatest among those of the devices of the vehicle. For this reason, the main battery is separately mounted on the vehicle considering weight balance and effective utilization of space of the vehicle.

In FIG. 1, the main battery 1 is divided into two main battery blocks 110 and 120.

FIG. 2 shows the devices of FIG. 1 mounted on the vehicle. The main battery blocks 110 and 120 are disposed at the front and rear portions of the body 10, respectively.

Accordingly, it is necessary to connect the main battery block 110 with the main battery block 120 and the inverter 4 through connecting lines 201 and 202. Thus, the connecting lines 201 and 202 longitudinally pass through the center of the body 10.

In the conventional electric system, the main battery 1 is disconnected, in a normal mode, from the main circuit with the main switch 2. The disconnection may also be achieved with the protective fuse 3 in case of failure of the main circuit.

FIG. 3 shows another method for disconnecting the main battery block 110 from the main battery block 120. In FIG. 3, the main switch 2 of FIG. 1 is divided into four switches 21-24 to carry out disconnection.

This method, however, presents a problem in that not only spaces for mounting the switches 21-24 but also cost of devices will increase compared with the system of FIG. 1.

SUMMARY OF THE INVENTION

It is therefore an object of the present invention to provide an electric system of an electric vehicle which ensures safety of the vehicle in case of a collision or the like, and which facilitates further use of electric vehicles by decreasing their cost.

According to an aspect of the present invention, there is provided an electric system of an electric vehicle comprising:

a main battery as a power supply;

a semiconductor power converter converting DC power supplied from the main battery into AC power;

an AC motor receiving the AC power and driving wheels of the electric vehicle;

first connecting lines connecting the main battery to the semiconductor power converter;

ignition signal generating means for generating an ignition signal upon impact caused by a collision of the electric vehicle; and first switches, each of the first switches being inserted into each one of the first connecting lines, and including an explosive for destroying conduction of the switch in response to the ignition signal.

Here, the main battery may consist of a plurality of battery blocks disposed at a plurality of places of the electric vehicle, and wherein the electric system may further comprise second connecting lines connecting the battery blocks, and second switches, each of the second switches being inserted into each one of the second connecting lines, and including an explosive for destroying conduction of the switch in response to the ignition signal.

The first switches may be inserted in the first connecting lines in a neighborhood of the terminals of the main battery.

The first switches and the second switches may be inserted in the first connecting lines and the second connecting lines in a neighborhood of the terminals of the main battery blocks.

The ignition signal generating means may be placed outside the first switches.

The ignition signal generating means may be placed outside the first switches and the second switches.

The ignition signal generating means may be included in each of the first switches.

The ignition signal generating means may be included in each of the first switches and second switches.

According to the present invention, the switches (impact destroying switches) are inserted between the main battery and the semiconductor power converter. The impact destroying switches break their conductive portions in case of an accident such as a collision, in which impact is applied to the body of the vehicle. The impact generates the ignition signal which ignites the explosives in the switches, thereby breaking (i.e., destroying) the switches. The impact destroying switches may be inserted between the main battery blocks as needed.

According to the present invention, the following advantages are derived.

(1) Since almost all portions of the connecting lines become free from the voltage after the impact destroying switches break, contact of the connecting lines does not cause fire, which facilitates a cut of the vehicle body in an accident.

(2) Safer electric vehicles can be implemented for the reason of the paragraph (1) above. As a result, the present invention is expected to serve to increase the use of electric vehicles.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 1:
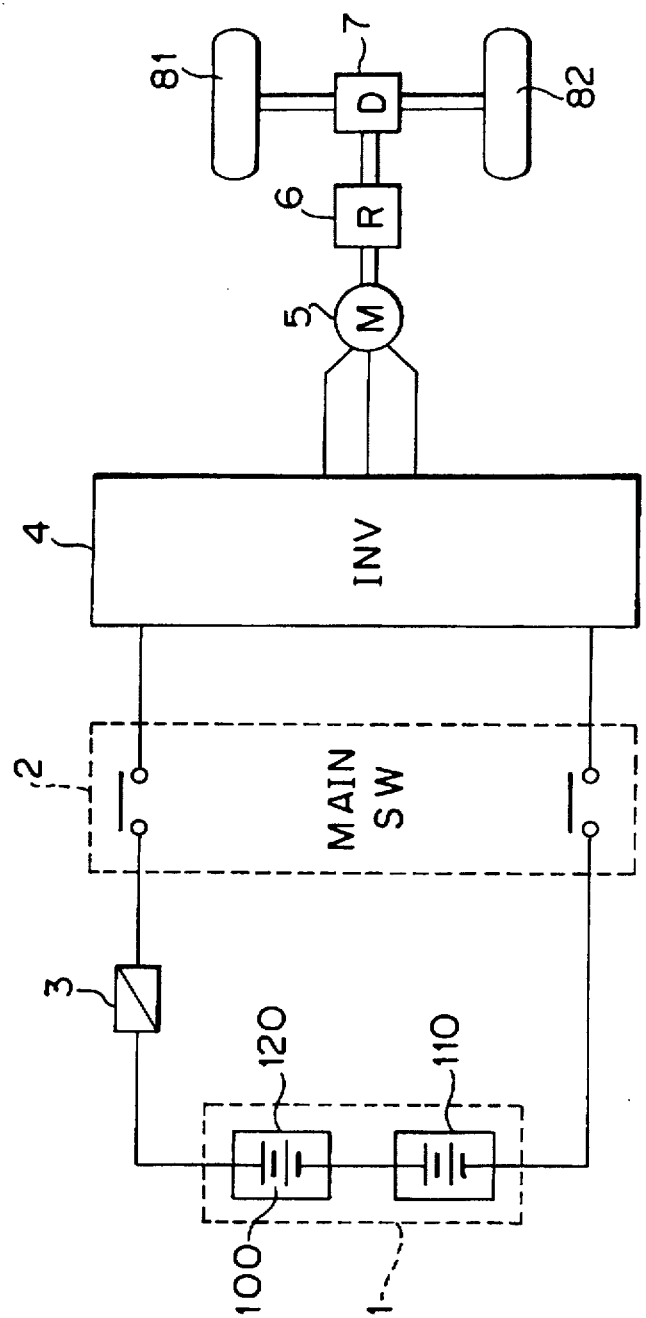
FIG. 1 is a block diagram showing a driving system of a conventional electric vehicle.
Figure 2:
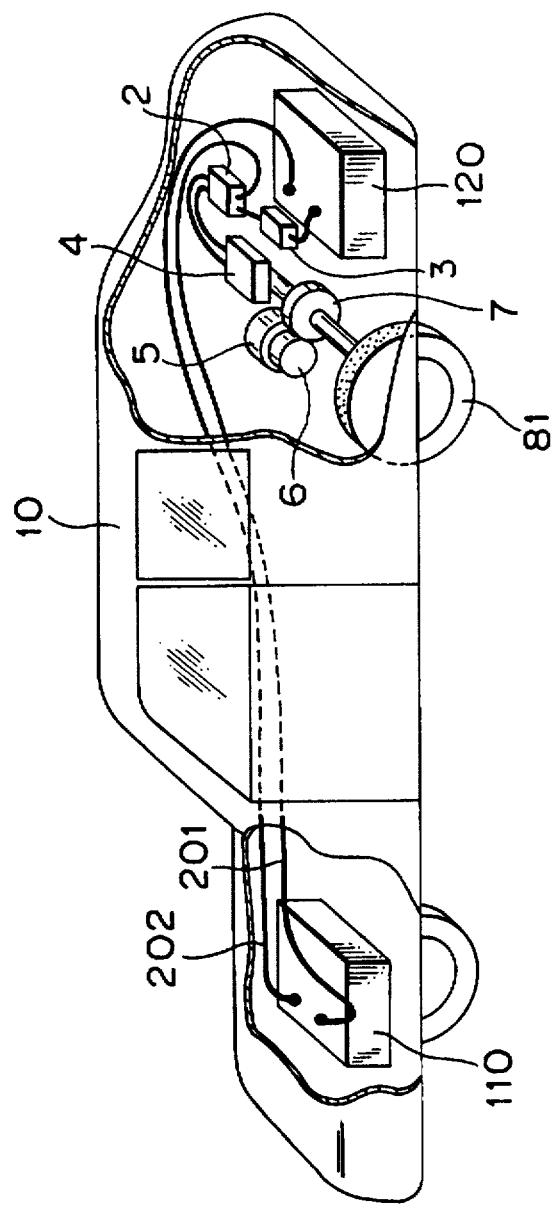
FIG. 2 is a perspective view of the conventional electric vehicle, on which devices of FIG. 1 are mounted.
Figure 3:
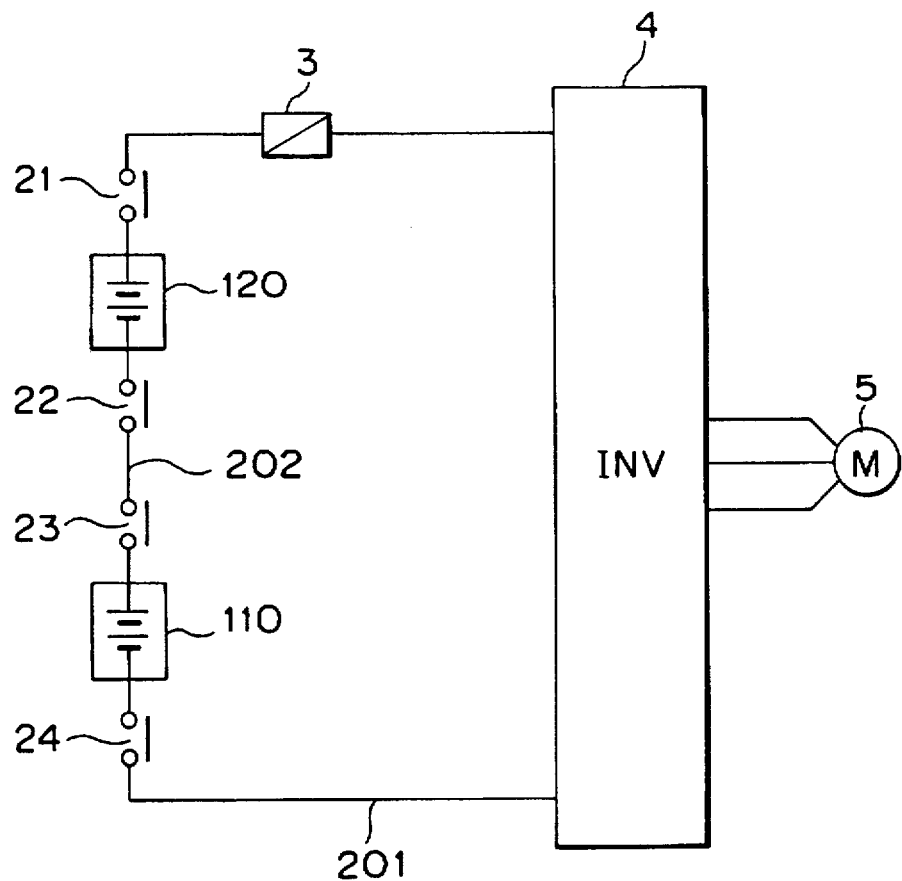
FIG. 3 is a block diagram showing a main portion of another conventional electric system.
Figure 4:
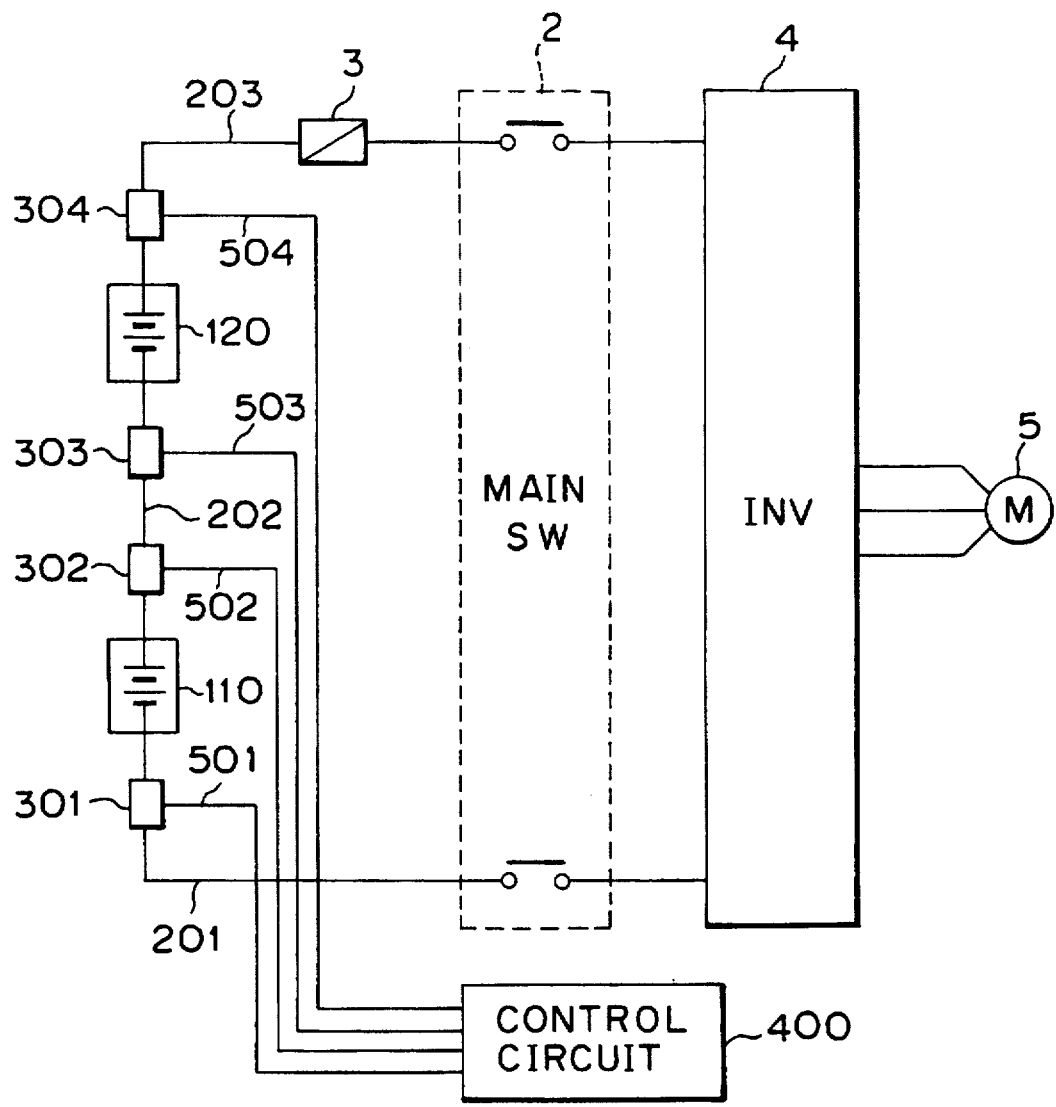
FIG. 4 is a block diagram showing a main portion of an embodiment of an electric system of an electric vehicle in accordance with the present invention.

FIG. 4 is a block diagram showing the major portion of the embodiment, in which the same portions as in FIG. 1 are designated by the same reference numerals. In this figure, the mechanical system ahead of the motor 5 is omitted.

Figure 5:
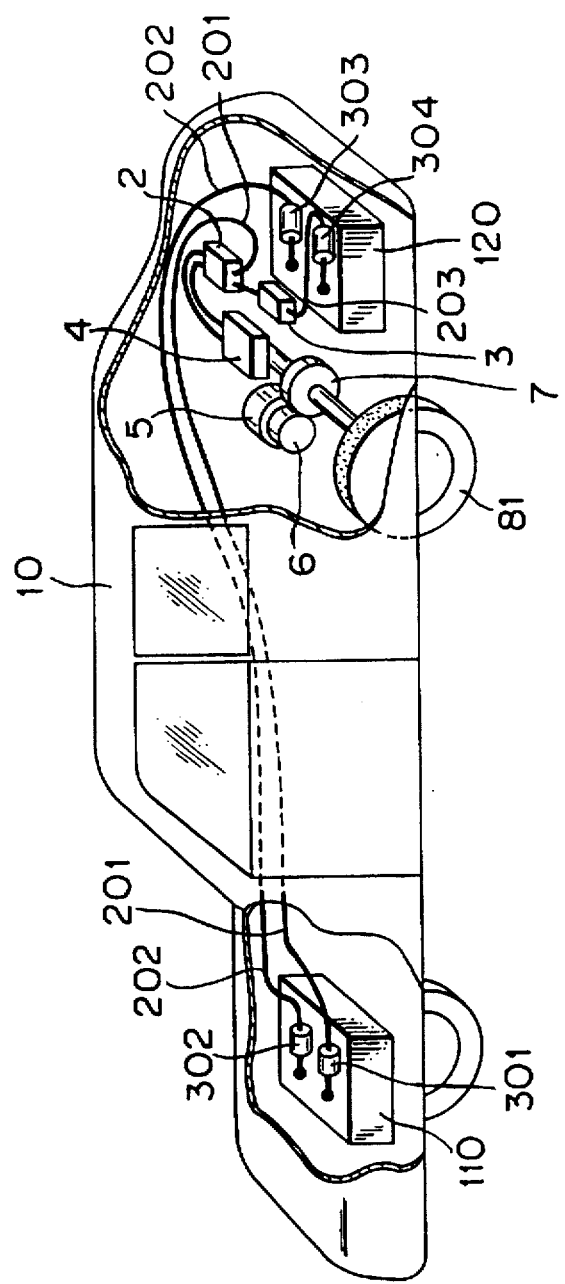
FIG. 5 is a perspective view of the electric vehicle of the embodiment, on which devices of FIG. 4 are mounted.

In FIG. 4, reference numerals 301-304 designate impact destroying switches. The impact destroying switches 301 and 302 are inserted in the connecting lines 201 and 202 near the main battery block 110 as shown in FIG. 5. On the other hand, the impact destroying switches 303 and 304 are inserted in the connecting lines 202 and 203 near the main battery block 120. Each of the impact destroying switches 301-304 includes an explosive such as gunpowder which is ignited by an actuating signal (ignition signal), thereby breaking a conductive portion in the switch, and cutting off the connecting line.

The reference numeral 400 designates a control circuit that provides the impact destroying switches 301-304 with the ignition signal through lines 501-504 in a collision or the like. The control circuit 400 includes an ignition signal generating circuit which produces the ignition signal upon impact of a collision by utilizing, for example, a control circuit that actuates an airbag. In FIG. 5, the ignition signal lines 501-504, and the control circuit 400 are omitted.

With this arrangement, in case of a collision, the impact destroying switches 301-304 will explode and be destroyed, thus directly and instantly destroying their conductive portions by the ignition signal from the control circuit 400, thereby breaking the circuit positively and instantaneously. As a result, the main battery blocks 110 and 120, and the connecting lines 201-203 are each disconnected from the circuit. Thus, no voltage is applied to the connecting lines 201-203.

Consequently, the problem in that the connecting lines 201-203 remain charged with the main battery voltage is eliminated. In addition, even if the main battery blocks 110 and 120 are placed at the front and rear portions of the vehicle, this does no harm while cutting the body of the vehicle after an accident because the connecting lines 201 and 202 are disconnected from the main battery 1.

The impact destroying switches may be inserted only into the connecting lines 201 and 203 which connect the main battery blocks 110 and 120 to the inverter 4. In this case, almost all portions of the connecting lines 201 and 203 become free from the voltage owing to the breaking operation of the impact destroying switches 301 and 304.

In the embodiment described above, the impact destroying switches 302 and 303 are inserted, in addition to the switches 301 and 304, into the connecting lines 202 which connects the main battery blocks 110 and 120. Accordingly, both connecting lines 201 and 202 longitudinally passing through the vehicle body become free from the voltage upon impact, thereby further improving the safety of the vehicle.

It is preferable that the impact destroying switches be connected close to the terminals of the main battery 1 in order to make the voltage applied portion of the connecting lines as short as possible.

Although the main battery 1 is divided into two blocks in the embodiment, the present invention is applicable when the main battery is not divided, or is divided into three or more blocks.

Furthermore, although the ignition signal to the impact destroying switches is supplied from the control circuit 400 outside the switches, it can be generated inside the switch by incorporating into the switch an impact detecting circuit which generates an ignition signal upon detecting impact in a collision. This makes it possible to obviate the control circuit 400 and the ignition signal lines 501-504, thereby further simplifying the arrangement.

Moreover, although the embodiment employs an inverter as a semiconductor power converter, and an AC motor as a wheel driving motor, the present invention can also be applied to a chopper functioning as the semiconductor power converter, and a DC motor functioning as a wheel driving motor, or to other electric systems.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electric system of an electric vehicle comprising:
   a main battery as a power supply;
   a semiconductor power converter converting DC power supplied from said main battery into AC power;
   an AC motor receiving the AC power, said AC motor driving wheels of the electric vehicle;
   a pair of first connecting lines connecting said main battery to said semiconductor power converter;
   ignition signal generating means for generating an ignition signal upon impact caused by a collision of said electric vehicle; and
   a pair of first switches, one of said pair of first switches being inserted into each of said first connecting lines, each of said first switches including a first explosive therein, the first explosive in each of said first switches being detonatable in response to said ignition signal for exploding and destroying a respective first switch, whereby conduction of each of said first switches is directly and instantaneously terminated by the exploding and destroying of said first switch.

2. The electric system of an electric vehicle as claimed in claim 1, wherein said main battery consists of a plurality of battery blocks disposed at a plurality of locations within said electric vehicle, and wherein said electric system further comprises at least one second connecting line connecting said battery blocks, and at least one second switch, said second switch being inserted into said second connecting line, and including at least one second explosive therein, said second explosive being detonatable in response to said ignition signal for exploding and destroying said second switch, whereby conduction of said second switch is directly and instantaneously terminated by the exploding and destroying of said second switch.

3. The electric system of an electric vehicle as claimed in claim 1, wherein said first switches are inserted in said first connecting lines in a neighborhood of the terminals of said main battery.

4. The electric system of an electric vehicle as claimed in claim 2, wherein said first switches and said second switches are inserted in said first connecting lines and said second connecting lines in a neighborhood of the terminals of said main battery blocks.

5. The electric system of an electric vehicle as claimed in claim 1, wherein said ignition signal generating means is placed outside said first switches.

6. The electric system of an electric vehicle as claimed in claim 2, wherein said ignition signal generating means is placed outside said first switches and said second switches.

7. The electric system of an electric vehicle as claimed in claim 3, wherein said ignition signal generating means is placed outside said first switches.

8. The electric system of an electric vehicle as claimed in claim 4, wherein said ignition signal generating means is placed outside said first switches and said second switches.

9. The electric system of an electric vehicle as claimed in claim 1, wherein said ignition signal generating means is included in each of said first switches.

10. The electric system of an electric vehicle as claimed in claim 2, wherein said ignition signal generating means is included in each of said first switches and second switches.

11. The electric system of an electric vehicle as claimed in claim 3, wherein said ignition signal generating means is included in each of said first switches.

12. The electric system of an electric vehicle as claimed in claim 4, wherein said ignition signal generating means is included in each of said first switches and second switches.

13. An electrical vehicle impact disconnect system for disconnecting electrical connecting lines which carry electrical current in the vehicle in case of an accident, the disconnect system comprising a plurality of explosive switches inserted in the electrical connecting lines at different locations in the vehicle, said switches being explodable for directly terminating conduction of said switches so as to instantaneously disconnect the electrical connecting lines.

14. The disconnect system according to claim 13, wherein the vehicle has an impact detection and control circuit for outputting a signal controlling a safety device such as an airbag, and wherein the signal from the impact detection and control circuit is provided to the plurality of explosive switches and activates the plurality of explosive switches to thereby disconnect the electrical connecting lines.

15. The disconnect system according to claim 13, further comprising impact detection means, disposed in the plurality of explosive switches, for detecting a vehicle impact indicative of an accident and activating the plurality of explosive switches to thereby disconnect the electrical connecting lines.

16. The disconnect system according to claim 13, further comprising an impact detection and control circuit disposed in the vehicle and connected to each of the plurality of explosive switches, for detecting a vehicle impact indicative of an accident and activating the plurality of explosive switches to thereby disconnect the electrical connecting lines.

17. An electric system of an electric vehicle comprising:

a main battery as a power supply;

a semiconductor power converter converting DC power supplied from said main battery into AC power;

an AC motor receiving the AC power, said AC power driving wheels of the electric vehicle;

a pair of first connecting lines connecting said main battery to said semiconductor power converter; and a pair of first switches, one of said pair of first switches being inserted into each of said first connecting lines, and each of said first switches comprising:

ignition signal generating means for generating an ignition signal upon impact caused by a collision of said electric vehicle; and a first explosive coupled to said ignition signal generating means of said first switch for receiving said ignition signal and being detonatable in response to said ignition signal for exploding said first switch, whereby conduction of said first switch is directly and instantaneously terminated by the exploding of said first switch.

18. The electric system as claimed in claim 17, wherein said main battery consists of a plurality of battery blocks disposed at a plurality of locations within said electric vehicle, and wherein said electric system further comprises:

at least one second connecting line connecting said battery blocks, and at least one second switch, said second switch being inserted into said second connecting line, and said second switch comprising:

ignition signal generating means for generating an ignition signal upon impact caused by said collision of said electric vehicle; and a second explosive coupled to said ignition signal generating means of said second switch for receiving said ignition signal and being detonatable in response to said ignition signal for exploding said second switch, whereby conduction of said second switch is directly and instantaneously terminated by the exploding of said second switch.

19. The electric system as claimed in claim 17, wherein each of said first switches is inserted adjacent a terminal of said main battery.

* * * * *